(12) United States Patent
Fudim

(10) Patent No.: US 6,547,552 B1
(45) Date of Patent: Apr. 15, 2003

(54) FABRICATION OF THREE-DIMENSIONAL OBJECTS BY IRRADIATION OF RADIATION-CURABLE MATERIALS

(76) Inventor: Efrem V. Fudim, 4815 N. Marlborough Dr., Milwaukee, WI (US) 53217

( * ) Notice: Subject to any disclaimer, the term of this patent is extended or adjusted under 35 U.S.C. 154(b) by 0 days.

(21) Appl. No.: 09/500,130

(22) Filed: Feb. 8, 2000

(51) Int. Cl.[7] ............................................. B29C 35/08
(52) U.S. Cl. ................................... 425/174.4; 264/401
(58) Field of Search .................... 264/401, 481, 264/488, 494, 496; 430/394, 324; 425/174.4

(56) References Cited

U.S. PATENT DOCUMENTS

| | | | | |
|---|---|---|---|---|
| 5,009,585 A | * | 4/1991 | Hirano et al. ............. 425/174.4 |
| 5,171,490 A | * | 12/1992 | Fudim ......................... 264/22 |
| 5,306,446 A | * | 4/1994 | Howe .......................... 264/22 |
| 5,474,719 A | * | 12/1995 | Fan et al. .................... 264/401 |
| 5,607,540 A | * | 3/1997 | Onishi ....................... 156/379.8 |
| 5,650,260 A | * | 7/1997 | Onishi ......................... 430/269 |
| 5,651,934 A | * | 7/1997 | Almquist et al. ........... 264/401 |
| 5,833,914 A | * | 11/1998 | Kawaguchi ................. 264/400 |
| 5,980,812 A | * | 11/1999 | Lawton ....................... 264/401 |

* cited by examiner

*Primary Examiner*—Jan H. Silbaugh
*Assistant Examiner*—Joseph S Del Sole

(57) ABSTRACT

Improved apparatus are diclosed for stepwise, layer by layer fabrication of three-dimensional objects by irradiation of radiation-curable materials, in which the critical steps of fast and efficient deposition of thin, flat layers of material covered with a radiation-transmitting film, as well as careful separation of the film upon irradiation, are achieved by using a reciprocating carriage that during its motion changes the elevation of the film. When the carriage is moving in one direction, the film is being laid down forming a layer, and when upon irradiation the carriage is returning, it is peeling the film off without distorting the formed layer. Improved apparatus are provided that build the whole object on an open platform without using a container or form each layer above container.

12 Claims, 2 Drawing Sheets

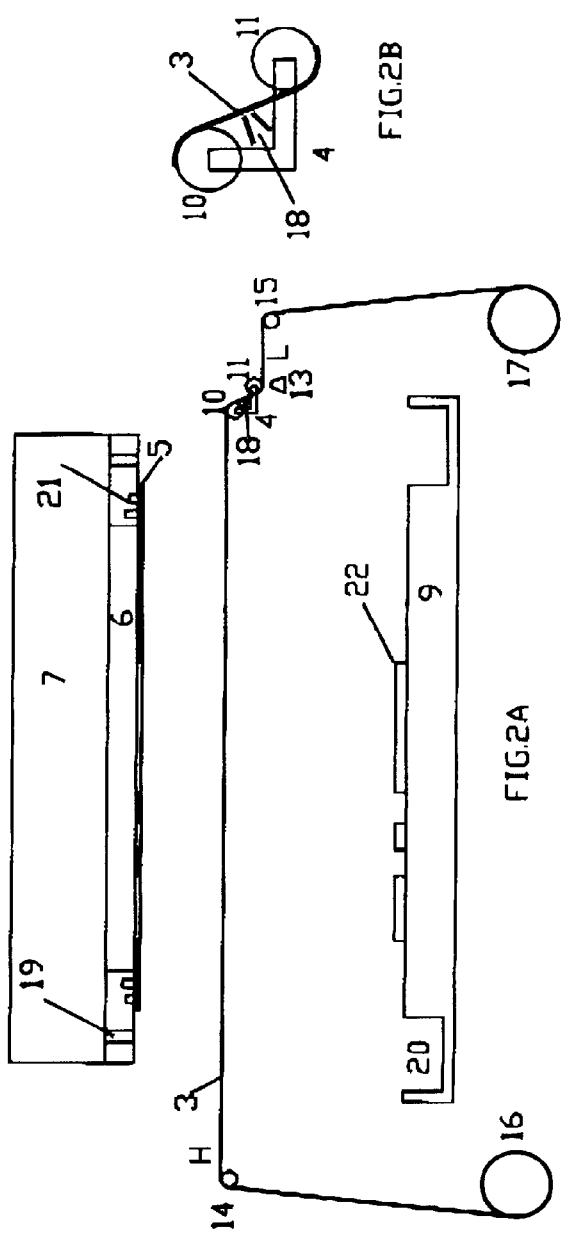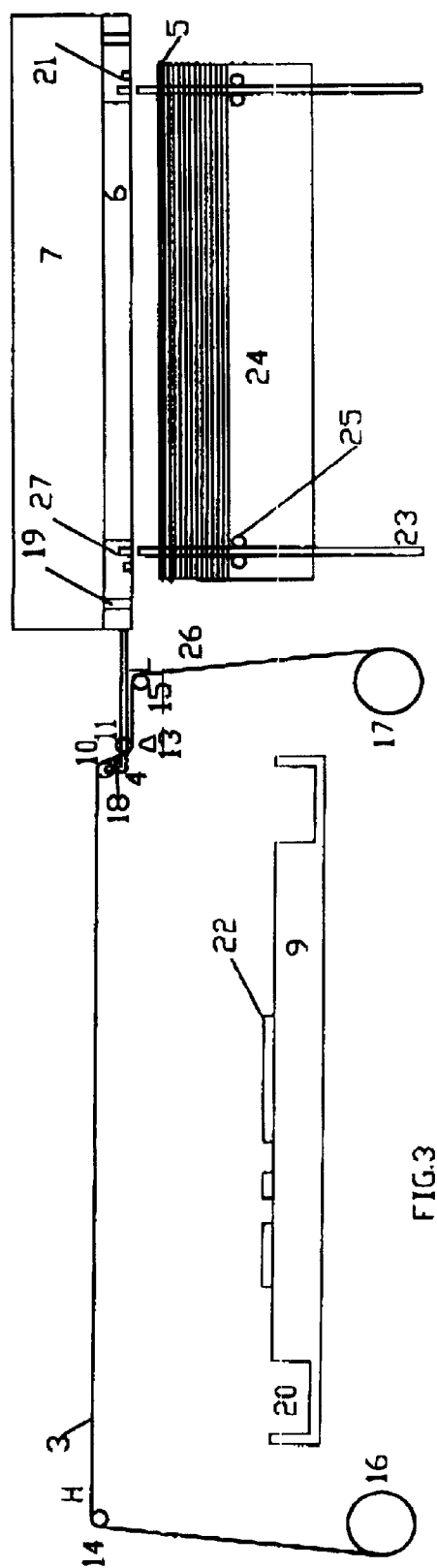

FABRICATION OF THREE-DIMENSIONAL OBJECTS BY IRRADIATION OF RADIATION-CURABLE MATERIALS

RELATED DISCLOSURE STATEMENT

Disclosure document No. 431,981 describing the invention was filed with the U.S. Patent Office on Feb. 14, 1998.

FIELD OF THE INVENTION

This invention relates generally to improvements in apparatus for production of three-dimensional (3D) objects. More specifically, it relates to apparatus for forming 3D objects using selective irradiation of radiation-curable materials (RCM). In response to radiation, RCM materials solidify or form 3D geometries with altered properties that allow by subsequent postprocessing (mechanical, chemical, thermal, etc.) to separate irradiated and nonirradiated portions from each other yielding a 3D object.

BACKGROUND OF THE INVENTION

The field is usually referred to as rapid prototyping, freeform fabrication, desktop manufacturing, automatic fabrication or solid imaging. Most of the processes in the field build 3D objects in slices, one atop another. The slices are very thin so that object surfaces are reproduced with good approximation. Generally, slice geometry is derived by slicing object's 3D model using computers and slices are formed by irradiating layers of RCM materials in areas where solidification is needed.

In 'simultaneous' processes (my U.S. Pat. Nos. 4,752,498; 4,801,477; 5,135,379 and 5,171,490) the whole slice is formed simultaneously, either by flooding irradiation through a pattern having transparent areas, like a photographic negative (mask) or electronically controlled transmission array (liquid-crystal display LCD, e.g.), or using an array irradiation source containing a large number of small light-emitting diodes LED, lasers, reflecting mirrors or cathode-ray tubes CRT, emitting numerous beams of radiation of very small cross-section. In 'scanning' processes (U.S. Pat. No. 4,575,330 of Charles Hull), each slice is formed by fast point by point scanning with a laser beam.

Since to achieve high dimensional accuracy many layers are formed, especially for thick objects, one of the most critical steps of any such process is deposition of very flat thin layers of RCM material that has to be fast, simple and lending itself to automation. In my U.S. Pat. No. 5,171,490 disclosed are deposition methods and means based on using a flexible film in contact with RCM material and a flat radiation-transmittent plate in contact with the opposite side of the film.

BRIEF SUMMARY OF THE INVENTION

The primary objects of this invention are to provide improved apparatus for making 3D objects in layers, one atop another, using irradiation of radiation-curable materials (RCM). This is accomplished by using a flexible radiation-transmitting film one end of which is held at the layer formation level and the other at the film separation level, and a carriage in between to provide a moveable transitional area of the film. The carriage contains a wet guide at the separation level on the inner, wet side of the film and a dry guide on the external, irradiation side of the film, and means for depositing RCM material onto the inner side of the transitional area of the film. When the carriage moves in one direction, the material is being deposited onto the inner side of the film and at the same time the film with a layer of material on it is being laid down into irradiation position. Upon irradiation the carriage moves in the opposite direction gently separating the film from the formed object and at the same time cleaning the film from the material remaining on it.

In apparatus employing a container, simple and fast automatic deposition of flat layers covered with film, as well as nondistortive film separation with simultaneous cleaning are achieved by forming and irradiating layers at least partially above the container. This provides a gap between the container and film allowing excess material to escape and thus form a flat layer.

BRIEF DESCRIPTION OF THE DRAWINGS

In the drawings:

FIG. 2A is a schematic view of a container-free embodiment;

FIG. 2B is an enlarged view of layering means of FIG. 2A; and

FIG. 3 is a schematic view of an embodiment of apparatus of FIG. 2A provided with mask mounting means.

DETAILED DESCRIPTION OF THE INVENTION

Figure 1A:
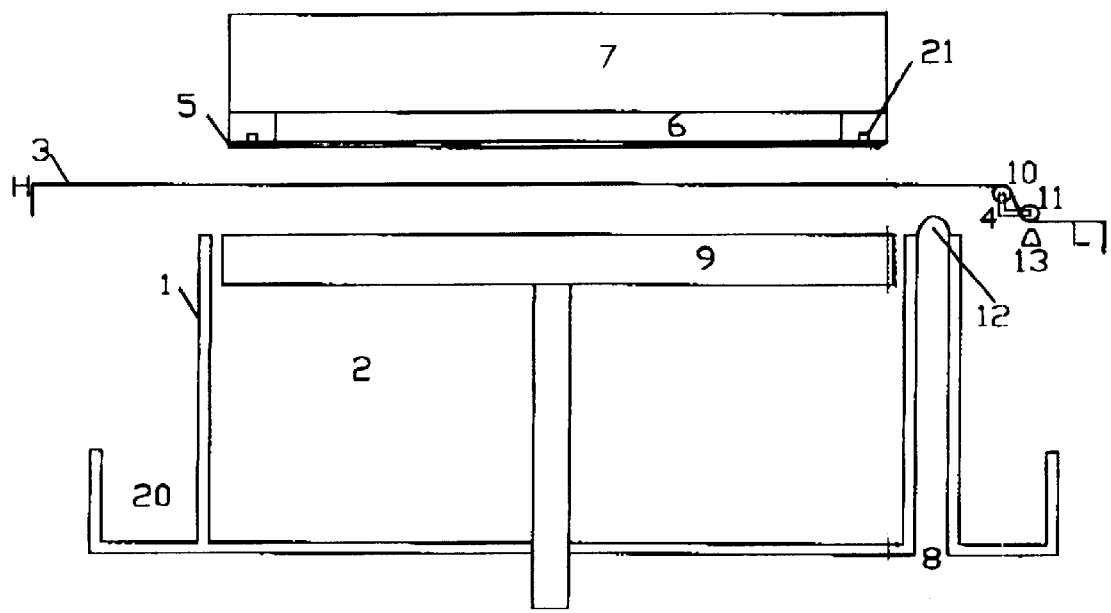
FIG. 1A is a schematic cross-sectional view of a preferred embodiment of the apparatus of the invention employing a container.
Figure 1B:
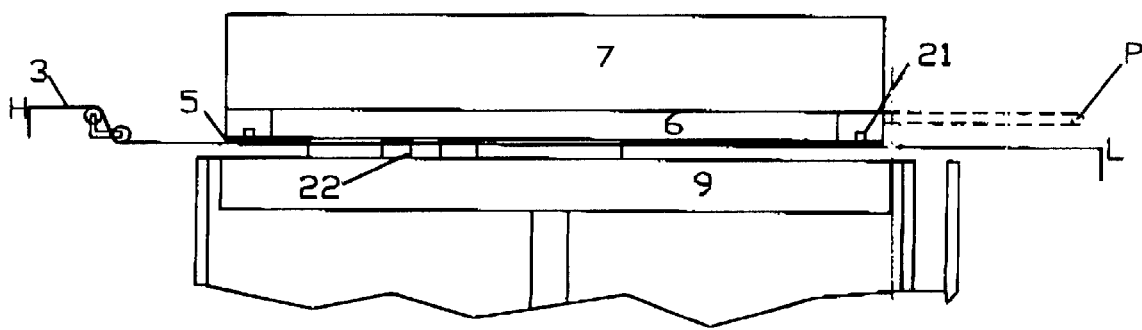
FIG. 1B is a partial view of the apparatus of FIG. 1A during irradiation.

The apparatus of FIGS. 1A, 1B includes container 1 filled with radiation-curable liquid 2, radiation-transmittent film 3, carriage 4, mask 5 (opaque areas are blackened), radiation-transmittent plate 6 that holds mask 5 by vacuum applied to grooves 21, and radiation source 7. For each layer, a quantity 12 of the liquid is supplied to the top of container 1 via conduit 8. Container 1 can be open in the bottom, with its side walls positioned very close to platen 9 if no surrounding seal is employed, and holding the liquid only above platen 9.

Parts are formed on platen 9 that moves vertically. Film 3 is stretched and its ends are held at different levels L and H. Carriage 4 includes a wet (10) and dry (11) film guides that keep film 3 at level H on the left of carriage 4 and at level L on the right side of the carriage. Guides 10, 11 can be idlers, blades, e.g. When carriage 4 is moving to the left, the film is being laid down at level L as shown on the partial view, spreading and covering the liquid. To allow fast evacuation of the excess liquid and minimize layer distortion, level L is set above the container to create a gap between film 3 and the top of container. As a result, each layer (or at least a portion of it) is deposited and formed above the container. The gap is limited by liquid viscosity and speed of operation since leaks may distort the layer.

Good flatness of the deposited layer and minimization of its distortion during irradiation are achieved by bringing plate 6 in direct contact or close proximity with film 3 at level L. Going slightly lower than level L provides additional stretching and flattening of the film. Other film-flattening means like a raising blade 13 can be used.

When the carriage moves to the right, the film is separated, raised to level H and at the same time cleaned of most unsolidified liquid, especially if wet guide 10 is a blade.

The apparatus builds objects layer by layer, one atop another. To form a layer, with carriage 4 at right and film at level H, platen 9 is dropped so that previous layer (platen 9 in case of first layer) is at a distance from level L equal to desired layer thickness. A quantity 12 of liquid is supplied to the top of container 1, carriage 4 moves to the left spreading the liquid and at the same time covering it with film at level L. Next, plate 6, with appropriate mask 5 attached underside, and means 7 are moved down into irradiation position coming in contact with the film (FIG. 1B). Then, proper radiation is applied to form the layer (22) and attach it to previous layer (to platen 9 in case of first layer). Finally, carriage 4 moves to the right peeling the film off the solidified layer, removing most of the liquid from the film and raising it to level H to complete the layer-forming cycle.

Instead of linear motion, plate 6 can employ rotational motion to come in and out of irradiation position using, for example, a lever pivoting around axis P as shown in dashed lines on FIG. 1B.

FIG. 2A shows an improved container-free apparatus that deposits liquid apart from the object. Carriage 4 (see FIG. 2B) is provided with an elongated liquid-dispensing nozzle 18 (rotating roller or sprayer) positioned against the transitional area of the film (its area between blades 10 and 11). While the carriage is moving to the left and bringing the film down to level L, liquid is being dispensed through nozzle 18 in a line across the film yielding a layer of liquid on the underside of the film at level L.

The use of a roll of film (16), take-up roller (17) and blades (idlers) 14, 15 at levels H and L allows to advance the film and replace worn or distorted film. This film advancing mechanism can also be employed in apparatus of FIGS. 1A, 1B.

Since the film has liquid on it and is mostly unsupported across its span during deposition, vacuum or other film-lifting means can be employed; vacuum can be generated by pumps, fans, etc. and applied via holes 19 outside the imaging area. Platen 9 is usually provided with a drain channel 20 for unsolidified liquid, like the one surrounding container 1 in FIGS. 1A, 1B.

In addition to the operating sequence of apparatus of FIG. 1A, the apparatus of FIG. 2A can employ other modes of operation. The object can be kept below the deposited layer during the carriage travel to the left and brought into contact with the new layer either before irradiation or after it. In the latter case additional irradiation is required to attach the formed layer.

FIG. 3 shows a container-free apparatus with mask-changing means. Plate 6 is rigidly attached to, and moving together with, carriage 4 so that the bottom of mask 5 is very close to the top of the film at level L. Radiation source 7 can be attached to plate 6, and if not, can either stay stationary over platen 9 or be coming down towards plate 6 for closer irradiation. Vacuum holes 19, blade 13 or other means can be used for additional stretching and flattening the film.

Masks are preloaded in a stack on pins 23 on mask platen 24. Each mask has 2 positioning holes in areas printed on masks in alignment with layer images. Pins 23 are held in platen 24 by friction using, for example, O-rings 25 or by magnetic or other means allowing relative vertical motion of pins and platen 24 with respect to each other. Masks are initially mounted with pins protruding. Plate 6 is provided with pin stops 27 that limit pins protrusion during the mask mounting process. It is possible to use a single nonround pin and a single matching hole on masks.

The apparatus of FIG. 3 forms objects similarly to that of FIG. 2A except that platen 6 moves together with carriage 4 and when carriage 4 is on the right, platen 6 is over the stack of masks, ready for the mounting of a new mask. Mounting is done by briefly bringing platen 24 with the mask stack towards plate 6 so that vacuum in grooves 21 (magnetic or other means) holds the top mask attached to plate 6. Platen 24 with the rest of masks and pins 23 then move down separating from the mounted mask allowing platen 6 to be moved to the left into irradiation position. If layer geometry changes, the mask is removed from platen 6 during its motion to the right when mask's right edge is passing over the mask-discharge space 26 and air pressure or other force is applied from plate 6 or space 26.

The apparatus of FIG. 3 works also with a container as in apparatus on FIGS. 1A, 1B.

Radiation-curable (RCM) materials, often referred to as photopolymers, can be in liquid, paste or other layerable, spreadable, sprayable, fluid form or be preformed as sheets. They range from low-viscosity liquids to RCM liquids with various particulate fillers to pastes of fine powders with RCM liquid as a binder. Magnacryl 2296, a liquid RCM of Beacon Chemical (Mount Vernon, NY), is one of many RCM materials useable in this invention. In many apparatus, a solid 3D object is formed upon irradiation; its postprocessing requires just removal of unsolidified liquid using solvents, detergents and/or ultrasonic or mechanical action, and in some cases flooding irradiation for additional crosslinking. In others, irradiation just alters RCM properties and subsequent postprocessing (chemical, thermal, etc.) is used to separate irradiated and nonirradiated portions and yield a 3D object.

Film 3 is made preferably of a material that preserves further crosslinking capability of the RCM material's surface irradiated in contact with it so that subsequent layer will intercrosslink forming a strong bond and the film will detach upon irradiation without distorting itself or the solidified layer (see U.S. Pat. No. 4,752,498). Such a material is available as TEFLON FEP (fluorinated ethylene propylene) from Du Pont of Wilmington, Del.

Plate 6 can be made of glass or other radiation transmittent materials; it can be a fiberoptic faceplate. For simultaneous irradiation with masks, radiation source 7 can employ black-light fluorescent bulbs of General Electric, mercury, etc. bulbs emitting radiation the RCM material is sensitive to. Masks can be made of mylar film using photoplotters, laser or inkjet printers, or by depositing opaque particles or ink directly onto plate 6. Liquid-crystal (LCD) or other flat panels modulating light transmittance represent electronically (digitally) controlled masks that have small enough pixels, or sufficient resolution, can be used instead of masks.

Instead of mask 5 and source 7, it is possible to use a laser and other sources of scanning irradiation, or such sources of simultaneous irradiation as an array of radiation-reflecting micromirrors such as DMD/DLM devices of Texas Instrument, arrays of light-emitting diodes LED, lasers or other microsources of radiation, provided they can have required resolution.

I claim:

1. An apparatus for producing three-dimensional objects from radiation-curable material layer by layer by application of modulated radiation to selectively solidify said material directly or after additional processing, said apparatus comprising:

(a) support means having a surface for building objects onto;

(b) layering means for forming a layer of material covered with a radiation-transmitting film and upon irradiation spacing said film over said layer to create a space between said film and said layer for forming therein successive layer;

(c) dispensing means for dispensing said material into said space; said dispensing means moving in said space back and forth over said layer; and (d) irradiation means for irradiating said layers through said film to form and attach successive layers of said object.

2. An apparatus for producing three-dimensional objects from radiation-curable material layer by layer by application of modulated radiation to selectively solidify said material directly or after additional processing, said apparatus comprising:

(a) support means having a surface for building objects onto;

(b) containing means having walls for containing unsolidified material around the object being formed;

(c) layering means for forming a layer of material covered with a radiation-transmitting film spaced over said container and for spacing said film farther over said container to create a space between said film and said layer for forming therein successive layer;

(d) dispensing means for dispensing said material into said space; and (e) irradiation means for irradiating said layers through said film to form and attach successive layers of said object.

3. An apparatus for producing three-dimensional objects from radiation-curable material layer by layer by application of modulated radiation to selectively solidify said material directly or after additional processing, said apparatus comprising:

(a) support means having a surface for building objects onto;

(b) layering means for forming a layer of material covered with a radiation-transmitting film and upon irradiation of the formed layer spacing said film over said layer to create a space between said film and said layer for forming successive layer therein; said layering means including a wet and dry guide being in contact with opposite sides of said film and moving back and forth in said space over said surface to affect said forming and spacing in alternate order; said wet guide moving in front of said dry guide during said forming of a layer;

(c) dispensing means for dispensing said material into said space; and (d) irradiation means for irradiating said layers through said film to form and attach successive layers of said object.

4. An apparatus of claim 1, 2 or 3 wherein said dispensing means include a liquid dispensing roller, nozzle, sprayer or any other dispensing component positioned in said space farther over said surface than said layer of material.

5. An apparatus of claim 3 wherein said layering means include a wet side of the film spaced over said layer at separation level, and said wet guide being a blade in contact with said film at said separation level.

6. An apparatus for producing three-dimensional objects from radiation-curable material layer by layer by application of modulated radiation to selectively solidify said material directly or after additional processing, said apparatus comprising:

(a) support means having a surface for building objects onto;

(b) layering means for forming a layer of material covered with a radiation-transmitting film and upon irradiation spacing the film over said layer to create a space between said film and said layer for forming therein successive layer;

(c) dispensing means for dispensing said material into said space:

(d) flattening means for flattening said film and said layer, said flattening means having flat contact means coming in contact with said film covering said layer and moving means for further decreasing distance between said film and said surface; and (e) irradiation means for irradiating said layers through said film to form and attach successive layers of said object.

7. An apparatus of claim 1, 2 or 6 wherein said layering means include a dry guide in contact with the dry side of said film covering said layer and a wet guide in contact with the opposite, wet side of the film spaced over said layer at separation level, said wet guide being a blade in contact with said film at said separation level.

8. An apparatus of claim 1, 2, 3 or 6 wherein said film is of fluorinated ethylene propylene or any other material that preserves further cross-linking capability of said material in contact with said film.

9. An apparatus of claim 6 wherein said moving means include means for rotating paid contact means to move said-film closer to said surface.

10. An apparatus of claim 1, 2, 3 or 6 wherein said irradiation means is provided with an array of miniature electronically controlled components for modulating transmittance, reflectance or generation of said irradiation to provide desired irradiation patterns.

11. An apparatus for producing three-dimensional objects from radiation-curable material layer by layer by application of modulated radiation to selectively solidify said material directly or after additional processing, said apparatus modulating radiation by replacing masks or any other patterns having areas of different radiation transmittance with at least one pattern-aligning hole, and including at least one pattern-aligning pin, a pattern support plate for prestacking said patterns onto and means for moving said patterns one by one from said pattern support plate to irradiation position, said pattern support plate provided with friction, magnetic or any other means for holding said pin in said pattern support plate so that said pin and said pattern support plate can move with respect to each other in the direction perpendicular to said pattern support plate.

12. An apparatus of claim 11 wherein said pin protrudes from said stack, and said pattern moving means is provided with a recessed pin stop to limit said pin's protrusion.

* * * * *